United States Patent [19]

Lang

[11] Patent Number: 5,529,137

[45] Date of Patent: Jun. 25, 1996

[54] POWER-ASSISTED STEERING FOR MOTOR VEHICLES

[75] Inventor: Armin Lang, Schwäbisch Gmünd, Germany

[73] Assignee: ZF Friedrichshafen AG, Friedrichshafen, Germany

[21] Appl. No.: 500,929

[22] PCT Filed: Feb. 5, 1994

[86] PCT No.: PCT/EP94/00326

§ 371 Date: Aug. 4, 1995

§ 102(e) Date: Aug. 4, 1995

[87] PCT Pub. No.: WO94/18051

PCT Pub. Date: Aug. 18, 1994

[30] Foreign Application Priority Data

Feb. 10, 1993 [DE] Germany .................. 40 03 854.9

[51] Int. Cl.⁶ ............................................. B62D 5/22
[52] U.S. Cl. ................. 180/417; 180/428; 180/441; 180/421; 137/627.5
[58] Field of Search ......................... 180/132, 141, 180/148; 137/627.5

[56] References Cited

U.S. PATENT DOCUMENTS

| 3,750,836 | 8/1973 | Kristof . |
| 4,607,717 | 8/1986 | Nakayama ............... 180/141 |

FOREIGN PATENT DOCUMENTS

| 4126020 | 2/1993 | Germany . |
| 662724 | 12/1951 | United Kingdom . |
| 1590515 | 6/1981 | United Kingdom . |
| 85/01924 | 5/1985 | WIPO . |

Primary Examiner—Richard M. Caby
Assistant Examiner—Victor E. Johnson
Attorney, Agent, or Firm—Davis, Bujold & Streck

[57] ABSTRACT

In a servo steering unit which is designed particularly for motor vehicles, a pinion in a steering housing meshes with a steering rack. A steering valve which serves to control the pressure medium for the servo steering unit has two inlet seat valves (10, 11) and two outlet seat valves (12, 13) whose closing members (14, 18) are displaced by actuating tappets (16, 17) depending on the rotation of a steering spindle. The outlet seat valves (12, 13) are open in the neutral position of the steering valve. The inlet seat valves (10, 11) can be actuated by the force of pressure springs (15) in the closing direction and are not opened until after closing of the associated outlet seat valve (12, 13). The pressure springs of both inlet seat valves (10, 11) on one side press against the actuating tappets (16, 17) and on the other side press constantly on the closing member (14). The pressure springs (15) are designed so that they exert a closing force on the closing members (14) in the neutral position of the steering valve and so that during displacement of the steering valve away from its neutral position, one of the pressure springs (15) rests without applying force on the closing member (14) as soon as the associated outlet seat valve (12, 13) is closed. This provides a servo steering system which, to a large extent, operates irrespective of production tolerances with a desired and constant power take-off.

3 Claims, 4 Drawing Sheets

5,529,137

POWER-ASSISTED STEERING FOR MOTOR VEHICLES

FIELD OF THE INVENTION

The invention concerns a servo steering unit, especially for motor vehicles. The servo steering unit includes a steering valve which has two inlet seat valves and two outlet seat valves, the closing members of which are movable by actuating tappets depending on a rotation of a steering spindle. The closing members of the inlet seat valve are here actuatable in a closing direction by the force of pressure springs, so that the inlet seat valves are closed in the neutral position of the steering valve. The outlet seat valves are open in the neutral position of the steering valves. The inlet seat valves do not open until the respective outlet seat valve closes.

BACKGROUND OF THE INVENTION

Such a servo steering unit has been disclosed in the older German patent application P 41 26 020.1. In said servo steering unit, the spring-loaded closing member of the inlet seat valve can be released by means of a stop disc. This prevents a stronger actuating force from being needed for opening the inlet seat valve than for opening the outlet seat valve.

To obtain the effect described, a very thorough coordination of two actuation spaces is required. A first space between an actuating tappet and the stop disc must here be smaller than a second space between the closing surface of a closing member of the outlet seat valve and a valve seat of the outlet seat valve situated on the closing member of the inlet seat valve. Since the actuation paths of the seat valves are in the range of a few tenths of a millimeter, the coordination is very difficult. In addition, in said servo steering unit only one centering spring is active at the beginning of the adjustment of the steering valve away from the neutral position. The pre-load force of the pressure spring acting upon the closing member of the inlet seat valve will increase only after overcoming the first space and the actuating tappet abuts on the stop disc. This result is contrary to the requirement generally existing in regard to steering valves of an increased stiffness of the steering in the central position.

SUMMARY OF THE INVENTION

The invention is based on the problem of improving a servo steering unit in the sense of preventing the above described disadvantages while maintaining the advantages. In particular, the coordination of the actuation sequence of the inlet and outlet seat valves is to be made easier. The intensification of the centering force as the adjustment of the steering valve increases is likewise to be prevented.

This problem is solved by the servo steering unit according to the present invention. The solution specially results from the fact that the pressure springs of both inlet seat valves rest on one side on the actuating tappets and on the other constantly on the closing members. Besides, the pressure springs must be designed in a manner such that, in the neutral position of the steering valve, they exert a closing force upon the closing members and, when the steering valve is adjusted away from its neutral position, only one pressure spring abuts without applying force on the closing member as soon as the associated outlet seat valve is closed.

Convenient and advantageous embodiments of the invention are indicated in the sub-claims. But the invention is not limited to the combination of features of the claims. Other logical possible combinations result for the expert from the claims and individual features of the claims depending on the existing problems.

For a specially good coordination it is advantageous to use pressure springs having very high spring ratios. This can be obtained in a specially favorable manner when the pressure springs are designed as plate springs. If the actuating tappet is made of two parts, then the part on which the plate spring abuts can be pressed into the other part until reaching the desired pre-load of the plate spring between the actuating tappet and the closing member of the inlet seat valve. The required tolerances can be easily obtained thereby.

BRIEF DESCRIPTION OF THE DRAWINGS

The invention is explained in detail herebelow with reference to three embodiments illustrated in the drawings. For the sake of simple presentation, the invention is described with reference to a rack-and-pinion servo steering unit. But the invention can also be applied to other servo steering units such as ball-and-nut servo steering units. In the drawings.

DETAILED DESCRIPTION OF THE PREFERRED EMBODIMENTS

Figure 1:
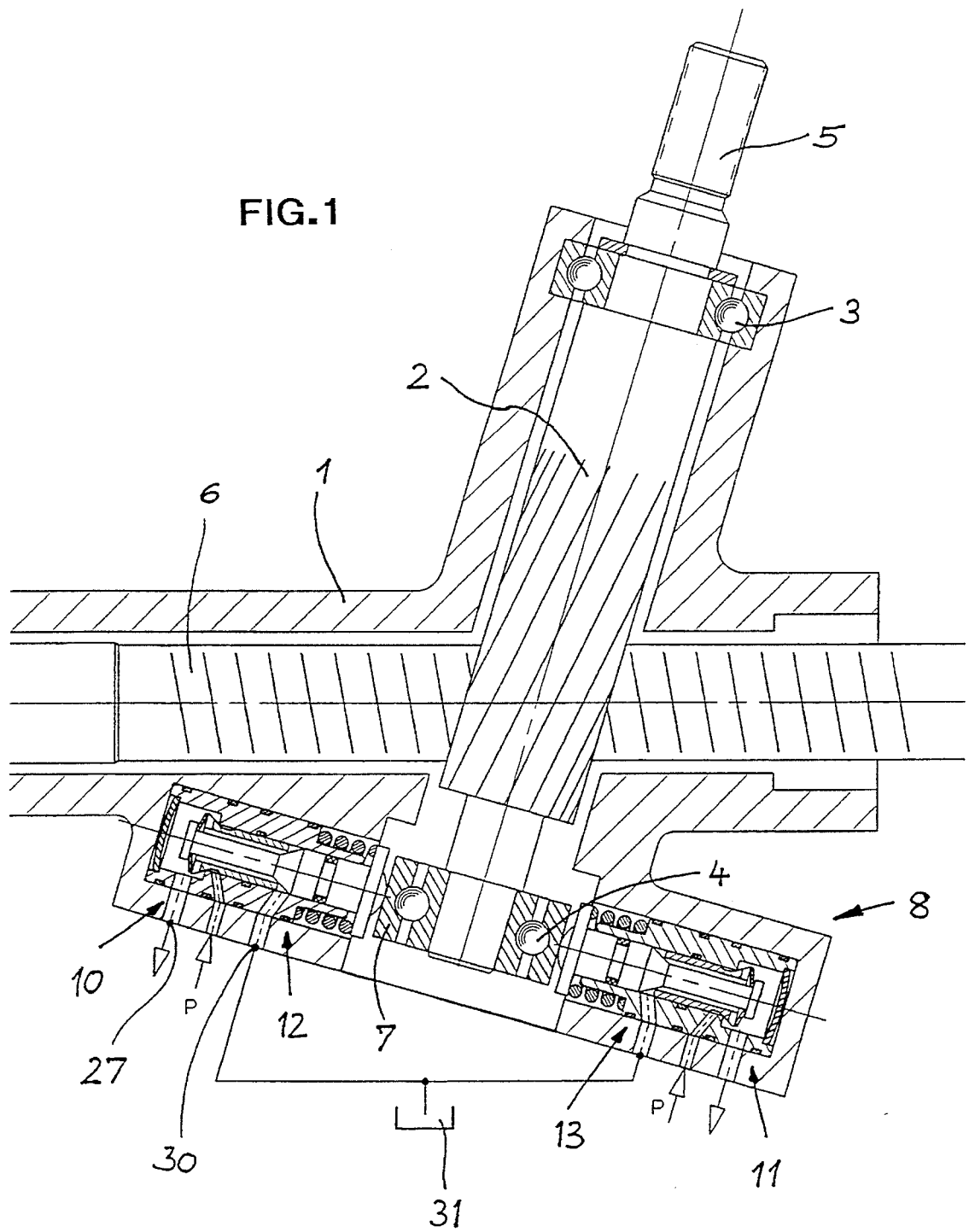
FIG. 1, 3 and 4 show longitudinal sections through three embodiments of the servo steering unit according to the invention.

One pinion 2 is rotatably mounted in a steering housing 1 on two bearings 3 and 4. The pinion 2 carries a steering-spindle connection 5 on one end for attachment to a steering element, such as a steering spindle with a steering hand wheel not shown. One of the bearings, preferably the bearing 3 which is in the proximity of the steering-spindle connection 5, is designed as fixed bearing. The other bearing, preferably the bearing 4 which is remote from the steering-spindle connection 5, is designed as an idler bearing. The pinion 2 meshes by its gearing with a rack 6 which is axially movably passed into the steering housing 1. The outer ring 7 of the bearing 4 is passed into the steering housing 1 so that it can move, with slight friction, in accordance with the movement of the lower part of the pinion 2 and perpendicular to the axis thereof. The importance of this movement will be explained in the course of the specification.

A steering valve 8, including two inlet seat valves 10 and 11 and two outlet seat valves 12 and 13, serves to steer the pressurized fluid, conveyed by the servopump, not shown, and conveniently stored in a tank to and from the pressure chambers of a servo-motor, not shown. The inlet and outlet seat valves 10, 11, 12, 13 are situated substantially perpendicular to the axis of the pinion 2 in the area of the idler bearing 4. One inlet seat valve 10 or 11 and one outlet seat valve 12 or 13 are here disposed coaxially to each other.

Both parts of the steering valve 8, each having one inlet seat valve 10 or 11 and one outlet seat valve 12 or 13, are designed substantially alike. Therefore, the precise construction of the steering valve 8 will be described below referring only to one part—the left part in FIG. 1—of the steering valve 8 with the inlet seat valve 10 and the outlet seat valve 12, with reference to the enlarged segment shown in FIG. 2.

In the neutral position of the steering valve 8, the inlet seat valve 10 is closed. This is obtained by the closing member 14 thereof being actuated in a closing direction by the force of a pressure spring 15 in the form of a plate spring. The pressure spring 15 rests on one side on the closing member 14 and on the other on a part 16 of an actuating tappet 17. The part 16 of the actuating tappet 17 passes through a bore of the closing member 14 and is fastened on the actuating tappet 17 proper. The fastening is effected, for instance, by pressing the part 16 into a bore of the actuating tappet 17, as will be explained in detail herebelow. On actuating tappet 17 is formed a closing member 18 of the outlet seat valve 12 which interacts with a valve seat 20 situated on the closing member 14. A centering spring 23 is held between a valve insert 21, firmly connected with the steering housing 1, and a collar 22 of the actuating tappet 17. The closing member 14 of the inlet seat valve 10 is pressed by the centering spring 23 and the pressure spring 15 against a valve seat 24 fastened to the housing. The valve seat 24 is formed, for instance, on the valve insert 21 fastened to the housing.

Figure 3:
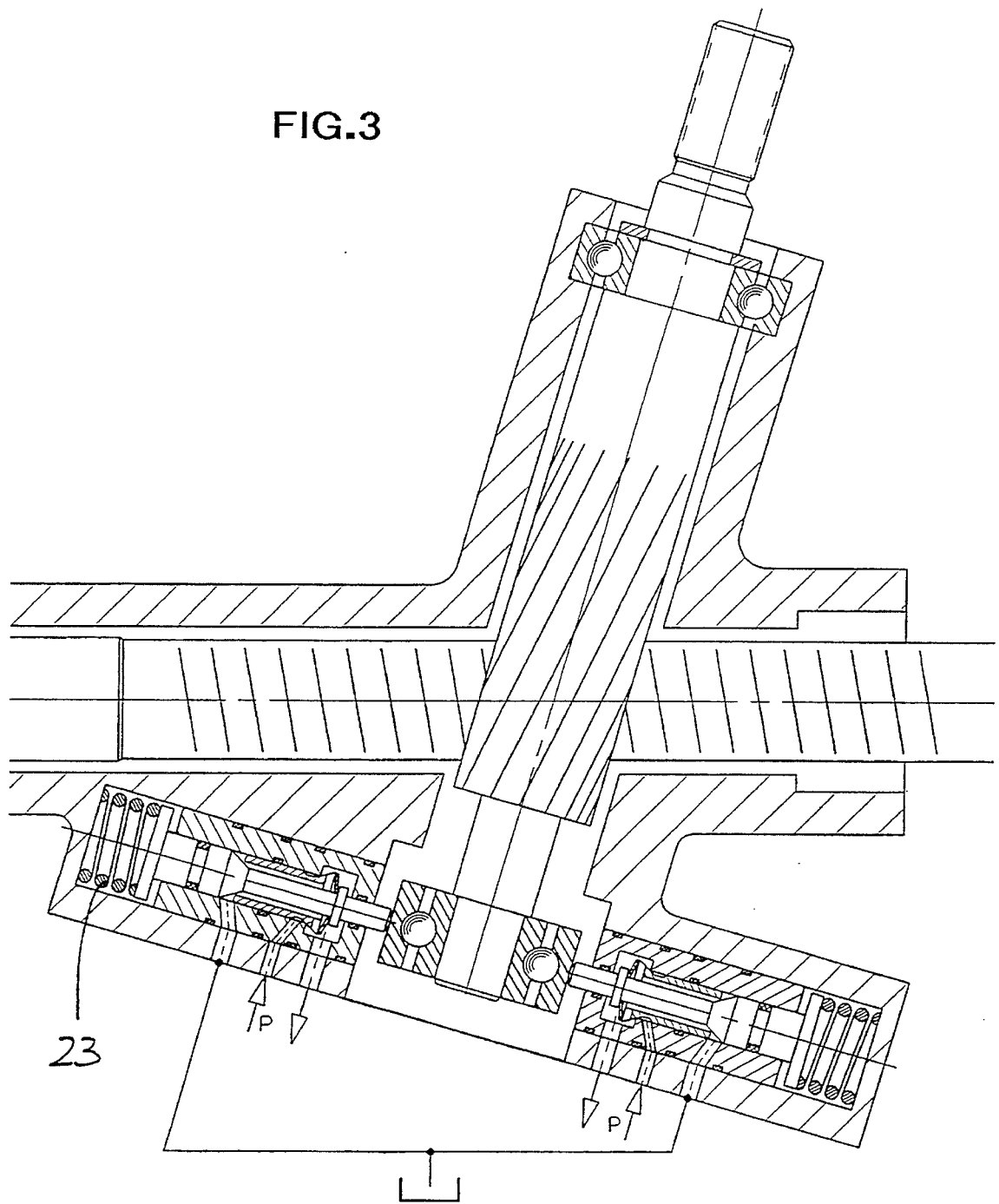

To supply the unit with pressurized fluid conveyed by the servopump, there is provided an input connection which, to simplify the illustration in FIG. 1 and 3, has been divided into two input connections designated with P in the drawings. The input connection P communicates via corresponding ducts with an input chamber 25 situated on the inlet seat valve 10. One chamber 26, which in a neutral position of the steering valve 8 is separated from the input chamber 25, communicates with a cylinder connection 27. In addition, the chamber 26 is connected by openings 28 in the closing member 14 with a return connection 30 and thus with a pressure medium tank 31.

Figure 2:
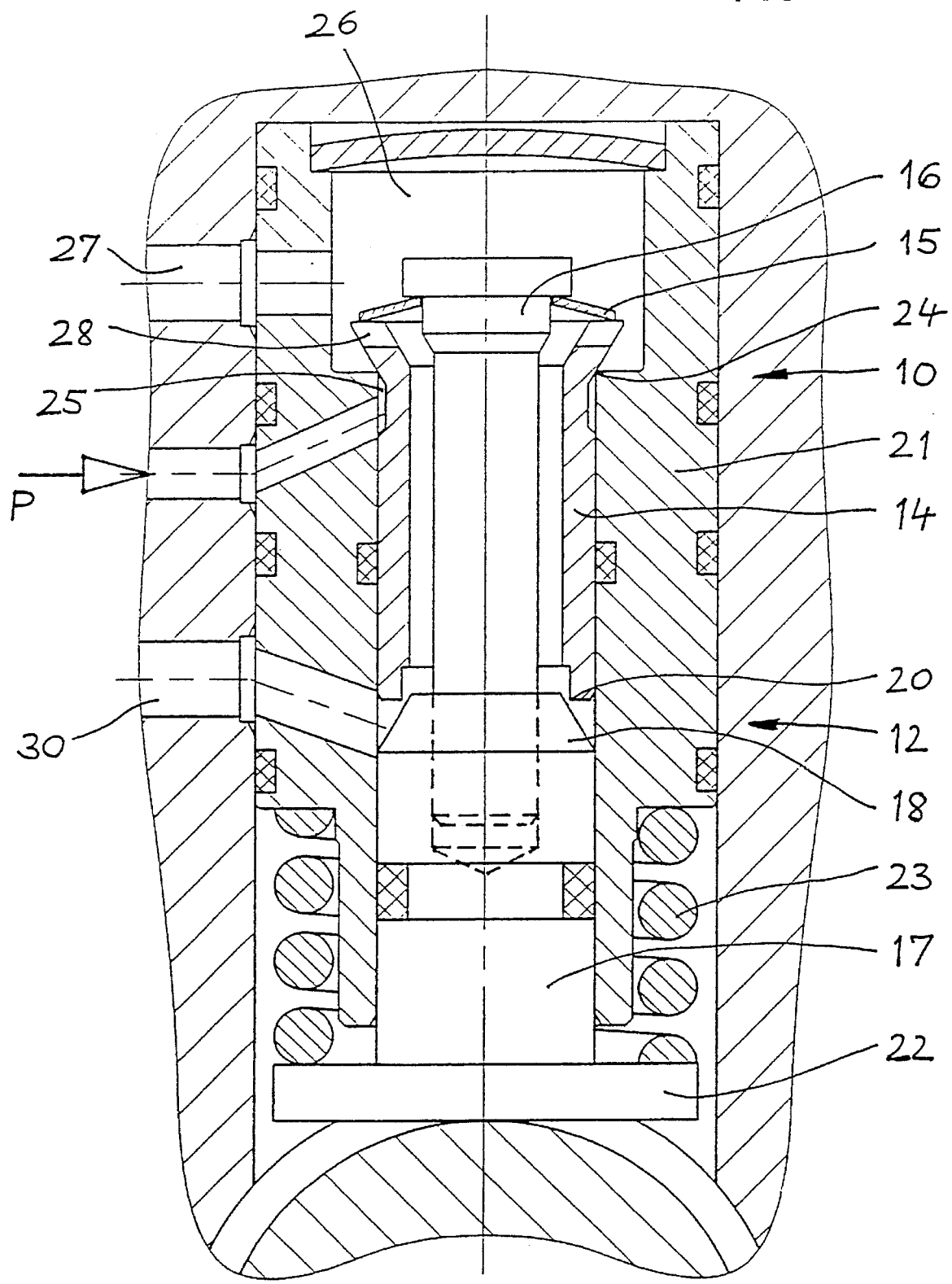
FIG. 2 shows a partial cross section through the servo steering unit in the area of one part of the steering valve according to the embodiment of FIG. 1.

The servo steering unit of the invention is described herebelow: If due to a rotation of the steering hand wheel, not shown, the pinion 2 is caused to rotate to the right, for instance, the gearing of the pinion 2 first rolls on the gearing of the rack 6 which momentarily is still stationary. The pinion 2 is thereby swung around the fixed bearing 3 by a very small angle. The idler bearing 4 is moved to the left. This movement is transmitted via the outer ring 7 of the idler bearing 4 to the actuating tappet 17 and thus to the closing member 18 of the outlet seat valve 12. In FIG. 2 the closing member 18 is upwardly moved far enough to abut on the valve seat 20, thus interrupting the connection of the cylinder connection 27 to the pressure medium tank 31. This movement occurs against the force of the centering spring 23. Up to this point of the movement, the pressure spring 15 acts upon the closing member 14 of the inlet seat valve 10 so that the latter remains closed. The compression and position of installation of the pressure spring 15 are designed so that the latter exerts, in the neutral position of the steering valve 8, a closing force upon the closing member 14, so that said closing force diminishes as the movement of the actuating tappet 17 increases and so that, at the moment when the closing member 18 snugly strikes against the valve seat 20, the pressure spring 15 abuts once more without applying force on the closing member 14. As the actuating tappet 17 moves further, the closing member 14 will accordingly raise itself from its valve seat 24 so as to create a communication from the input connection P, via the input chamber 25 and the chamber 26, to the cylinder connection 27. There builds up a corresponding pressure which, in a manner known per se, holds the balance in the sense of a hydraulic reaction of the actuating force on the actuating tappet 17.

This description of the operation clearly shows that in the servo steering unit of the invention, instead of the hitherto given sudden unloading of the closing body, it is a steady unloading that takes place and the desired course of the centering force curve is thus obtained.

Since the actuating tappet 17 with the part 16 consists of two parts, it is possible when assembling the valve unit, which can be pre-assembled in the valve insert 21, to very accurately adjust the force of the pressure spring 15 by pressing the part 16 into the actuating tappet 17 proper, while taking into account the tolerances, until the plate spring, upon closing of the outlet seat valve 20, abuts without prestress on the collar of the part 16 and on the closing member 14 and thus is obtained, in the neutral position of the steering valve 8, the desired prestress of the plate spring.

If the valve units are inversely inserted, as shown in FIG. 3, that is, if the actuating tappet 16, 17 is moved away from the outer ring 7 of the bearing 4, not to the side of the outlet seat valve, but to the side of the inlet seat valve, then the advantage results that the centering spring 23 simultaneously acts as a pressure-limiting spring.

Figure 4:
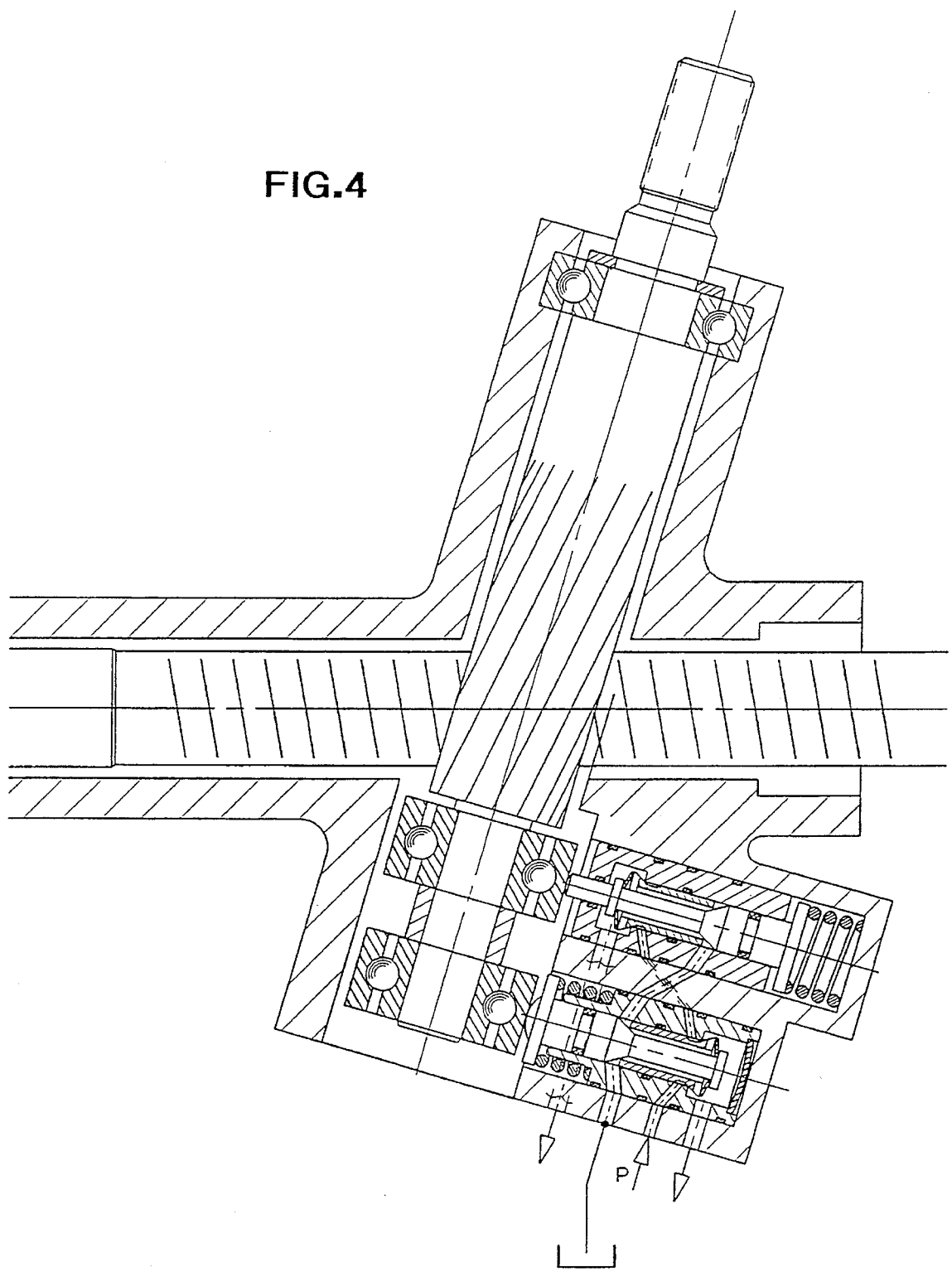

As shown in FIG. 4, for reasons of installation, that is, in case of very specified volume ratios, a mixed solution of the arrangements of FIG. 1 and FIG. 3 is possible.

In the three embodiments, the actuation of the steering valve 8 results from the transverse movement of the pinion 2. But with the same effect and the same advantages, it is also possible to dispose the steering valve 8 in two valve parts parallel with the pinion 2 and actuate it by a corresponding drag disc, as indicated in principle in the older German patent application P 41 26 020.1. Such an installation where the axial movement of an input member of a steering unit, in this case the pinion, is used for actuating the steering valve is also possible in other steering units, such as in a ball-and-nut servo steering unit.

| Reference numerals |
| --- |
| 1 steering housing |
| 2 pinion |
| 3 bearing |
| 4 bearing |
| 5 steering spindle connection |
| 6 rack |
| 7 outer ring |
| 8 steering valve |
| 9 — |
| 10 inlet seat valve |
| 11 inlet seat valve |
| 12 outlet seat valve |
| 13 outlet seat valve |
| 14 closing member |
| 15 pressure spring (plate spring) |
| 16 part of 17 |
| 17 actuating tappet |
| 18 closing member |
| 19 — |
| 20 valve seat |
| 21 valve insert |
| 22 collar |
| 23 centering spring |
| 24 valve seat |
| 25 input chamber |
| 26 chamber |
| 27 cylinder connection |
| 28 opening |
| 29 — |
| 30 reverse connection |

-continued

| Reference numerals |
| --- |
| 31 pressurized fluid tank |
| P input connection |

I claim:

1. A servo steering unit, specially for motor vehicles, having a steering valve (8) which has two inlet seat valves (10, 11) and two outlet seat valves (12, 13), closing members (14, 18) which are movable by an actuating tappet (16, 17) in accordance with a movement of rotation of a steering spindle, wherein said closing members (14) of said inlet seat valves (10, 11) can be actuated in a closing direction by the force of pressure springs (15) and thereby be closed in a neutral position of said steering valve (8), said outlet seat valves (12, 13) being opened in the neutral position of said steering valve (8) and said inlet seat valves (10, 11) being opened only after the closing of the respective associated outlet seat valve (12, 13), comprises:

said pressure springs (15) of both inlet seat valves (10, 11) rest on one side on said actuating tappets (16, 17) and on another side constantly on said closing members (14) and said pressure springs (15) exert in the neutral position of said steering valve (8) a closing force upon said closing members (14) and when said steering valve (8) is adjusted away from its neutral position, a respective pressure spring (15) abuts without applying force on said closing member (14) as soon as the associated outlet seat valve (12, 13) is closed.

2. A servo steering unit according the claim 1, said pressure springs (15) are plate springs.

3. A servo steering unit according to claim 2, wherein said actuating tappet (16, 17) is formed of two parts and one part (16), on which abuts said plate spring, is pressed far enough into said other part (17) to obtain, in the neutral position of said steering valve (8), a desired prestress of said plate spring.

* * * * *

UNITED STATES PATENT AND TRADEMARK OFFICE
CERTIFICATE OF CORRECTION

PATENT NO. : 5,529,137
DATED : Jun. 25, 1996
INVENTOR(S) : Armin LANG

It is certified that error appears in the above-identified patent and that said Letters Patent is hereby corrected as shown below:

Title page, item [30], Foreign Application Priority Data, Feb. 10, 1993 [DE] Germany........ change "40 03 854.9" to "43 03 854.9"

Signed and Sealed this

Twenty-ninth Day of October 1996

Attest:

BRUCE LEHMAN

*Attesting Officer*      Commissioner of Patents and Trademarks